United States Patent [19]

Huxtable et al.

[11] Patent Number: 4,963,341
[45] Date of Patent: Oct. 16, 1990

[54] PROCESS FOR DEGRADING HYPOCHLORITE AND SODIUM HYPOCHLORITE

[75] Inventors: William P. Huxtable, Concord; William L. Griffith, Oak Ridge; Alicia L. Compere, Knoxville, all of Tenn.

[73] Assignee: The United States of America as represented by the Department of Energy, Washington, D.C.

[21] Appl. No.: 350,816

[22] Filed: May 12, 1989

[51] Int. Cl.$^5$ .................. C01D 3/04; C01D 15/04; C01B 13/00; B01J 23/00
[52] U.S. Cl. .................. 423/499; 423/579; 502/314
[58] Field of Search ............ 423/579, 449; 210/763, 210/762; 502/314

[56] References Cited

U.S. PATENT DOCUMENTS

| | | | |
|---|---|---|---|
| 4,073,873 | 2/1978 | Caldwell et al. | 423/499 |
| 4,297,333 | 10/1981 | Crawford et al. | 423/499 |
| 4,368,110 | 1/1983 | Caldwell et al. | 204/290 F |
| 4,400,304 | 8/1983 | Clark et al. | 502/159 |
| 4,764,286 | 8/1988 | Bon et al. | 210/763 |

OTHER PUBLICATIONS

Catalytic Sodium Hypochlorite Degradation Using a Kynar Stabilized Catalyst.

*Primary Examiner*—John Doll
*Assistant Examiner*—Brian M. Bolam
*Attorney, Agent, or Firm*—Katherine P. Lovingood; Stephen D. Hamel; William R. Moser

[57] ABSTRACT

A process for degrading hypochlorite waste and lithium hypochlorite solutions uses a cobalt oxide/molybdenum oxide catalyst formed from about 1–10 w/w % cobalt oxide and 1–15 w/w % molybdenum oxide disposed on a suitable substrate. The major advantage of the catalyst lies in its high degree of effectiveness and its very low cost.

13 Claims, No Drawings

PROCESS FOR DEGRADING HYPOCHLORITE AND SODIUM HYPOCHLORITE

The Government has rights in this invention pursuant to Contract No. DE-AC05-84OR21400 awarded by the U.S. Department of Energy.

BACKGROUND OF INVENTION

1. Field of the Invention

The present invention relates generally to a process for degrading hypochlorite waste and lithium hypochlorite and, more particularly, to a degradation process which utilizes a cobalt oxide/molybdenum oxide catalyst.

2. Description of Related Art

The disposal of hazardous chemical wastes into the environment is prohibited by federal regulations. Alkali metal hypochlorites, which are generally considered hazardous materials, are constituents of some industrial wastes and must be decomposed before the waste can be disposed of properly.

The removal of hypochlorite from industrial alkali streams has been a process challenge for many years. These streams are produced by electrolytic production of chlorine and from the removal of chlorine by caustic scrubbing. Depending on industrial process constraints, hypochlorite concentrations can range from less than 1% to above 10%. Although hypochlorite can be used as an industrial germicide, a chlorinating agent for environmental control processes, and a bleaching agent, the presence of other stream constituents can limit its use. Where this is the case, methods which convert waste hypochlorite to chloride can be used to facilitate disposal or chloride recycling. Oxygen gas, a byproduct of some conversion processes, can also be readily discharged or recycled. Facilities which generate thousands of gallons of hypochlorite containing wastes each week have a limited ability for disposing of the waste to the degree that a more feasible disposal method is necessary.

One material used for hypochlorite degradation is a Kynar/cobalt oxide preparation, a proprietary catalyst, which is disclosed by U.S. Pat. No. 4,400,304 to Clark et al, and discussed in Compere et al, "Catalytic Sodium Hypochlorite Degradation Using a Kynar Stabilized Catalyst," Oak Ridge National Laboratory Publication No. TM-10471, June (1987). However, this catalyst contains a large amount of cobalt, a critical strategic material, and is costly in view of its effectiveness. Another method for catalytically decomposing hypochlorite using cobalt oxide is also disclosed in U.S. Patent 4,073,873 to Caldwell et al which discloses the catalytic decomposition of hypochlorite by the action of a single-metal spinel of $Co_3O_4$ coated on an inert support. Cobalt oxide is known for other uses, such as for example use with electroconductive substrates as disclosed by U.S. Pat. No. 4,368,110 to Caldwell et al.

Present lithium process technology produces waste streams containing a metal contaminated sodium hypochlorite/sodium hydroxide stream. The process can be rearranged so effluent streams are substantially recycled if lithium hypochlorite can be catalytically degraded. This development is desired but requires adjustment of catalyst and process conditions to fit lithium chemistry.

SUMMARY OF THE INVENTION

It is therefore an object of the present invention to provide an improved means and method for the degradation of hypochlorite in alkali waste solutions.

It is a further object of the present invention to provide a more effective and less costly method for the degradation of hypochlorite.

The foregoing objects and others are accomplished in accordance with the present invention, generally speaking, by providing a process to degrade hypochlorite into chloride and oxygen which includes contacting an aqueous hypochlorite basic solution with a catalyst comprising about 1-10 w/w % cobalt oxide and about 1-15 w/w % molybdenum oxide on a suitable substrate. In another embodiment a similar process for degrading lithium hypochlorite is provided in which waste solution concentration is lowered in order to minimize carbonate precipitation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

The process of the present invention for degrading hypochlorite waste may be employed at a conventional waste treatment facility which includes a chemical reactor such as a stirred tank or upflow or downflow bed, which may employ either a liquid or gas continuous system. The chemical reactor may operate at any temperature in the liquid range of water at one atmosphere, such as for example at temperatures between 10 and 90° C. During the process, the pH of an aqueous solution containing the hypochlorite waste is first adjusted to above about 9 to decrease cobalt oxide solubility.

After pH adjustment, the aqueous solution is contacted with a cobalt/oxide molybdenum oxide (CoMo oxide) catalyst. The catalyst is composed of an inert support or substrate coated with Co/Mo oxide. A variety of substrates may be employed including, but not limited to, aluminas, stoneware, silica gel, sand and other natural materials such as limestone, plastics, glasses, assorted ceramics, metals, whiskers and wires. The shape of the substrate may vary with use although it is reasonable to expect catalyst activity to increase with increasing catalyst surface area.

The Co/Mo oxide coating disposed on the substrate is preferably composed of about 1-10 w/w % cobalt oxide and about 1-15 w/w % molybdenum oxide, and more preferably about 3-8 w/w % of cobalt oxide and about 3-8 w/w % molybdenum oxide. The Co/Mo oxide coating may be formed on the substrate by sequential application of clear solutions of metal salts. Parts are dried, and in some cases, fired, between applications. Application methods vary, with spray and dip methods being the most common at present. After drying, the coated parts are fired. The Co/Mo oxide catalyst used in the process of the present invention does not contain any spinel according to powder x-ray diffraction spectra tests. Peaks characteristic of spinels were not found in the powder x-ray diffraction spectra of the samples tested. This finding contrasts the process of the present invention from processes employing the single-metal spinel of $Co_3O_4$ for hypochlorite decomposition as disclosed for example by U.S. Pat. No. 4,073,873 to Caldwell et al.

In comparison to the conventional Kynar/cobalt oxide preparation as noted above, the catalyst of the present invention contains one tenth as much cobalt, a critical strategic material, costs one twentieth as much, and is ten times more effective than the Kynar/cobalt oxide catalyst.

In accordance with another embodiment of the present invention, a buffered alkaline lithium solution is used to scrub chlorine gas produced by electrolysis. The alkaline lithium hypochlorite solution is passed over a bed of catalyst containing at least a surface layer of cobalt oxide - molytdenum oxide. The catalyst degrades aqueous lithium hypochlorite to aqueous lithium chloride (for process reuse) and gaseous oxygen. As opposed to the sodium processes, solution composition, i.e. the waste solution concentration, is lowered to minimize carbonate precipitation. Although the decrease in carbonate solubility with temperature must be considered, process temperatures are limited only by conditions in which water is liquid, and the catalyst support surface may be any material able to withstand process conditions. Fluid flow may be either gas or aqueous continuous. The addition of molybdenum to the catalyst should decrease cobalt solubility, thereby increasing useful catalyst life and decreasing contamination of process recycle streams.

This catalyst may be attached to a variety of supports, including aluminas, stoneware, silica gel, sand, plastics, glasses, assorted ceramics, metals, whiskers and wires. Shape can vary according to use, although it is reasonable to expect activity to increase with increasing catalyst surface area. Catalyst may be added to a stirred reactor or used as an upflow or downflow bed (liquid or gas continuous). Reaction temperature may fall anywhere in the range of liquid water.

EXAMPLE 1

Using a conventional hypochlorite waste treatment facility, the pH of an aqueous solution containing hypochlorite was adjusted to above 9. The solution was then contacted with the catalyst — a bed of alumina support material coated with about 3% cobalt oxide and about 14% molybdenum oxide in accordance with a first embodiment of the present invention. The hypochlorite, upon contact with the catalyst, decomposed into chloride and oxygen gas. A typical reaction is as follows:

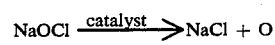

The chloride ion recombined with the cation and the oxygen was released as a gas. Thus, a hazardous material was decomposed into disposable unhazardous materials.

The tested material is commercially available for normal use in oil refinery operations for gas-phase catalytic cracking of hydrocarbons. It is made of 3/64 inch diameter ceramic pellets with a coating of 14% molybdenum oxide and 3% cobalt oxide. The subject system was operated at temperatures around 25° C.

COMPARATIVE EXAMPLE

An embodiment of the catalyst of the present invention was tested under a variety of conditions using an upflow bed system. The results are reported in Tables 1 and 2. The Co/Mo oxide catalyst used for the runs in Tables 1 and 2 was a commercial product, KF-742-1.3Q, of Akzo Chemie America, 1300 Bay Park Road, Pasadena, TX 77507. Manufacturer's analysis indicated that the material was 14% molybedenum oxide and 3% cobalt oxide. The results from Tables 1 and 2 compare favorably to similar studies performed with a Kynar/cobalt oxide catalyst the results of which are indicated in Table 3. The Kynar/cobalt oxide catalyst was formed as described in U.S. Pat. No. 4,400,304. Note that the measured reaction rate of the process of the present invention reported in Table 1 is substantially greater than that for the Kynar/cobalt oxide catalyst as reported in Table 3.

TABLE 1

| | Upflow runs using cobalt molybdenum mixed oxide catalyst | | | | | | |
|---|---|---|---|---|---|---|---|
| Temperature °C. | Feed as Cl. mg/l | Feed Rate, ml/s | Effluent as Cl. mg/l | Feed pH | Fraction Removed as Cl | Measured Reaction Rate $S^{-1}$ | Run No. |
| 25 | 14,361 | 0.2071 | 10 | 11.6 | 0.99931 | 0.00753 | 126 |
| | 15,780 | 0.4433 | 142 | 11.6 | 0.99101 | 0.01043 | 127 |
| | | 1.0081 | 1,213 | 11.6 | 0.92315 | 0.01292 | 128 |
| | 20,567 | 0.2008 | 2,057 | 13.8 | 0.90000 | 0.00231 | 123 |
| | 20,957 | 0.1956 | 2,571 | 13.8 | 0.87733 | 0.00205 | 122 |
| | 21,702 | 0.4545 | 5.975 | 13.8 | 0.72467 | 0.00293 | 124 |
| | | 0.9728 | 13,404 | 13.8 | 0.38235 | 0.00234 | 125 |
| 40 | 75,707 | 0.1852 | 177 | 13.8 | 0.99766 | 0.00560 | 116 |
| 55 | 75,707 | 0.1834 | | 13.8 | 1.00000 | | 115 |
| | | 0.4019 | 30 | 13.8 | 0.99961 | 0.01574 | 114 |
| | | 0.9225 | 6,773 | 13.8 | 0.91054 | 0.01112 | 113 |
| 70 | 75,707 | 0.1946 | 1 | 13.8 | 0.99998 | 0.01058 | 110 |
| | | 0.4259 | 6 | 13.8 | 0.99993 | 0.02021 | 111 |
| | | 0.9191 | 603 | 13.8 | 0.99204 | 0.02219 | 112 |

TABLE 2

| First order reaction rate models for mixed Co/Mo oxide catalyst[a] | |
|---|---|
| Model | Multiple-$R^2$ |
| All Temperatures and Feed Concentrations in Model | |
| k = 0.00440 + 0.000322 T − 0.00360 pH | 0.778 |
| k = 0.04687 + 0.000258 T − 0.00352 pH +0.877 4.89 × $10^{-8}C_f$ − 5.53 × $10^{-6}\theta$ | |
| Only 25° C. and < 2% $C_f$ Data in Model | |
| k = 0.05188 − 0.000358 pH | 0.876 |

[a] $\theta$ is empty bed residence time (s). $C_f$ is Cl feed concentration in mg/liter. T is °C. The fraction hypochlorite converted is given by $F_{converted} = 1 - e^{-k}$.

TABLE 3

Upflow runs using Kynar-cobalt catalyst

| Temperature °C. | Feed as Cl, mg/l | Feed Rate, ml/s | Effluent as Cl mg/l | Feed pH | Fraction Removed as Cl | Measured Reaction Rate $s^{-1}$ | Ion |
|---|---|---|---|---|---|---|---|
| 25 | 3,213 | 0.2441 | 255 | 11.05 | 0.92071 | 0.00309 | Li |
|  | 3,050 | 0.2385 | 235 | 11.11 | 0.92291 | 0.00305 | Na |
| 55 | 3,227 | 0.8006 | 328 | 11.10 | 0.89835 | 0.00914 | Li |
|  | 3,191 | 0.8432 | 497 | 11.24 | 0.87244 | 0.00867 | Na |
|  | 3,298 | 0.5216 | 94 | 11.10 | 0.97151 | 0.00927 | Li |
|  | 3,191 | 0.4371 | 38 | 11.24 | 0.98822 | 0.00970 | Na |
|  | 3,227 | 0.2428 | 6 | 11.05 | 0.99815 | 0.00763 | Li |
|  | 3,050 | 0.2057 | 1 | 11.24 | 0.99963 | 0.00811 | Na |

As a means of illustrating further embodiments of the process of the present invention, further tests were conducted which measured the rate constant for the hypochlorite decomposition reaction rates of the Co/Mo oxide catalysts used in the process of the present invention as compared to the rates exhibited by employing cobalt and molybdenum separately.

Near-saturation clear solutions of $Co(NO_3)_2 6H_2O$ and $(NH_4)_6Mo_7 4H_2O$ were prepared. These solutions were approximately 2M as Mo or Co. Stock solution pH was adjusted with hydrochloric acid or ammonia if needed. Small amounts, typically 1.0 grams of Linde B alumina, were weighed into porcelain evaporating dishes. The appropriate amounts of stock solutions, together with enough distilled water to permit preparation of a smooth paste, were added to the alumina powder. The paste was mixed until smooth and then dried at 100 to 105° C. overnight. The catalysts were then fired at 550° C. in air for one hour. After firing, the catalysts were cooled, mixed, and stored in capped bottles. Then, 100 mg of catalyst material was weighed into 50 ml flasks and 20 ml of aqueous hypochlorite solution was added. The flasks were shaken for about one hour and the catalyst powder was then filtered off. The catalyzed solutions were then titrated to determine the amounts of cobalt and molybdenum remaining.

As is evident from the results in Tables 4 and 5, the rate constants exhibited by both the separate cobalt and molybdenum catalysts were significantly lower than those exhibited by the Co/Mo oxide catalysts employed in the process of the present invention.

TABLE 4

Activity of air-fired alumina-supported catalysts as a function of cobalt concentration, 25 C, pH 12.1

| Co, % w/w | $K_1$ | $K_1$/Co |
|---|---|---|
| 1.13 | 0.63 | 55.92 |
| 2.20 | 1.63 | 74.07 |
| 3.26 | 1.76 | 53.99 |
| 4.26 | 2.35 | 55.08 |
| 5.25 | 3.35 | 63.80 |
| 6.20 | 2.07 | 33.35 |
| 7.01 | 3.55 | 50.63 |
| 7.91 | 3.81 | 48.16 |
| 8.62 | 3.95 | 45.85 |
| 9.44 | 4.21 | 44.65 |

TABLE 5

Activity of air-fired alumina-supported catalysts as a function of molybdenum concentration, 25 C, pH 12.1

| Mo, % w/w | $K_1$ |
|---|---|
| 1.86 | 0.33 |
| 3.59 | 0.37 |
| 6.89 | 0.00 |
| 8.40 | 0.46 |
| 9.84 | 0.08 |
| 10.84 | 0.37 |
| 12.54 | 0.37 |
| 13.70 | 0.17 |
| 14.94 | 0.17 |

TABLE 6

Activity of air-fired alumina-supported catalysts as a function of cobalt and molybdenum concentration, 25 C, pH 12.1

| Co, % w/w | Mo, % w/w | $K_1$ | $K_1$/Co |
|---|---|---|---|
| 0.92 | 13.57 | 2.12 | 229.04 |
| 1.88 | 12.21 | 1.91 | 101.58 |
| 2.87 | 10.90 | 2.21 | 76.94 |
| 3.75 | 9.16 | 3.56 | 94.95 |
| 4.74 | 7.68 | 4.69 | 98.97 |
| 6.94 | 4.69 | 8.43 | 121.37 |
| 7.77 | 3.16 | 9.89 | 127.26 |
| 8.54 | 1.54 | 5.05 | 59.13 |

EXAMPLE 2

As a means of demonstrating another embodiment of the present invention in which a buffered alkaline lithium solution is used to scrub chlorine gas produced by electrolysis, 50 g of lithium hydroxide and 3 liters of distilled water were placed in a mechanically stirred 5 liter flask and sparged with chlorine gas until an excess of chlorine was observed in the flask. 50 g of lithium carbonate was then added, an amount in excess of expected solubility. The slurry was again sparged with chlorine, and a clear solution was formed. After storage for several weeks, and sparging with air to remove residual chlorine, no solids were observed. Upon titration and evaporation, the flask appeared to contain a mixture of lithium chloride and lithium hypochlorite.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for degrading hypochlorite into chloride and oxygen which comprises contacting aqueous hypochlorite basic solution with a catalyst comprising cobalt oxide and molybdenum oxide disposed on a substrate, said oxides having no spinel formation evident from x-ray diffraction spectra tests.

2. The process of claim 1, wherein said catalyst comprises about 1-10 w/w % cobalt oxide and about 1-15 w/w % molybdenum oxide disposed on said substrate.

3. The process of claim 2, wherein said aqueous hypochlorite basic solution has a pH of above about 9.

4. The process of claim 2, wherein said substrate comprises a member selected from the group consisting of silica gel, sand, plastic, glass, ceramic, and metal.

5. The method of claim 2, wherein said substrate comprises ceramic pellets.

6. The process of claim 2, wherein said aqueous hypochlorite basic solution is contacted with said catalyst in a chemical reactor selected from the group consisting of stirred tank, upflow bed, and downflow bed, wherein said chemical reactor employs a liquid or gaseous continuous system and operates at a temperature within the liquid range of water.

7. The process of claim 6, wherein said chemical reactor is operated at a temperature of about 25° C.

8. A process for degrading lithium hypochlorite into aqueous lithium chloride and oxygen which comprises passing alkaline lithium hypochlorite solution over a bed of catalyst comprising at least a surface layer of cobalt oxide and molybdenum oxide disposed on a substrate, said oxides having no spinel formation evidence from x-ray diffraction spectra tests, wherein the concentration of said lithium hypochlorite solution is lowered to minimize carbonate precipitation.

9. The process of claim 8, wherein said catalyst comprises about 1-10 w/w % cobalt oxide and about 1-15 w/w % molybdenum oxide disposed on said substrate.

10. The process of claim 9, wherein said substrate comprises a member selected from the group consisting of silica gel, sand, limestone, calcite, plastic, glass, ceramic, and metal.

11. The process of claim 8, wherein said aqueous hypochlorite basic solution is contacted with said catalyst in a chemical reactor selected from the group consisting of stirred tank, upflow bed, and downflow bed, wherein said chemical reactor employs a liquid or gaseous continuous system and operates at a temperature within the liquid range of water.

12. The process of claim 4 wherein said substrate is in a physical form selected from the group consisting of whiskers and wires.

13. The process of claim 10 wherein said substrate is in a physical form selected from the group consisting of whiskers and wires.

* * * * *